United States Patent [19]

Wei

[11] Patent Number: 4,525,545

[45] Date of Patent: Jun. 25, 1985

[54] HOMOGENIZER PROCESS FOR FORMING EMULSION/SUSPENSION POLYMERS

[75] Inventor: Chung H. Wei, Wilmington, Del.

[73] Assignee: General Electric Company, Selkirk, N.Y.

[21] Appl. No.: 282,630

[22] Filed: Jul. 13, 1981

Related U.S. Application Data

[63] Continuation of Ser. No. 920,599, Jun. 29, 1978, abandoned.

[51] Int. Cl.³ .............................................. C08F 2/18
[52] U.S. Cl. ...................................... 526/65; 525/243; 526/88
[58] Field of Search ..................... 260/29.6 R, 29.7 R; 525/243; 526/65, 88

[56] References Cited

U.S. PATENT DOCUMENTS

| | | | |
|---|---|---|---|
| 3,189,583 | 6/1965 | McCaw | 260/86.1 |
| 3,370,105 | 2/1968 | De Bell | 525/243 |

FOREIGN PATENT DOCUMENTS 1458367  12/1976  United Kingdom .

*Primary Examiner*—Paul R. Michl

[57] ABSTRACT

An improved process is disclosed for forming polymeric materials by a multistep, emulsion/suspension polymerization procedure. The improvement comprises using homogenization to disperse the monomeric reactants during the initial emulsion polymerization portion or portions of the multistep polymerization reaction to thereby reduce the amount of emulsifier that would be present for potential emulsifier-suspending agent interference during the later suspension polymerization portion or portions of the process. This improvement yields a cleaner reaction.

5 Claims, 1 Drawing Figure

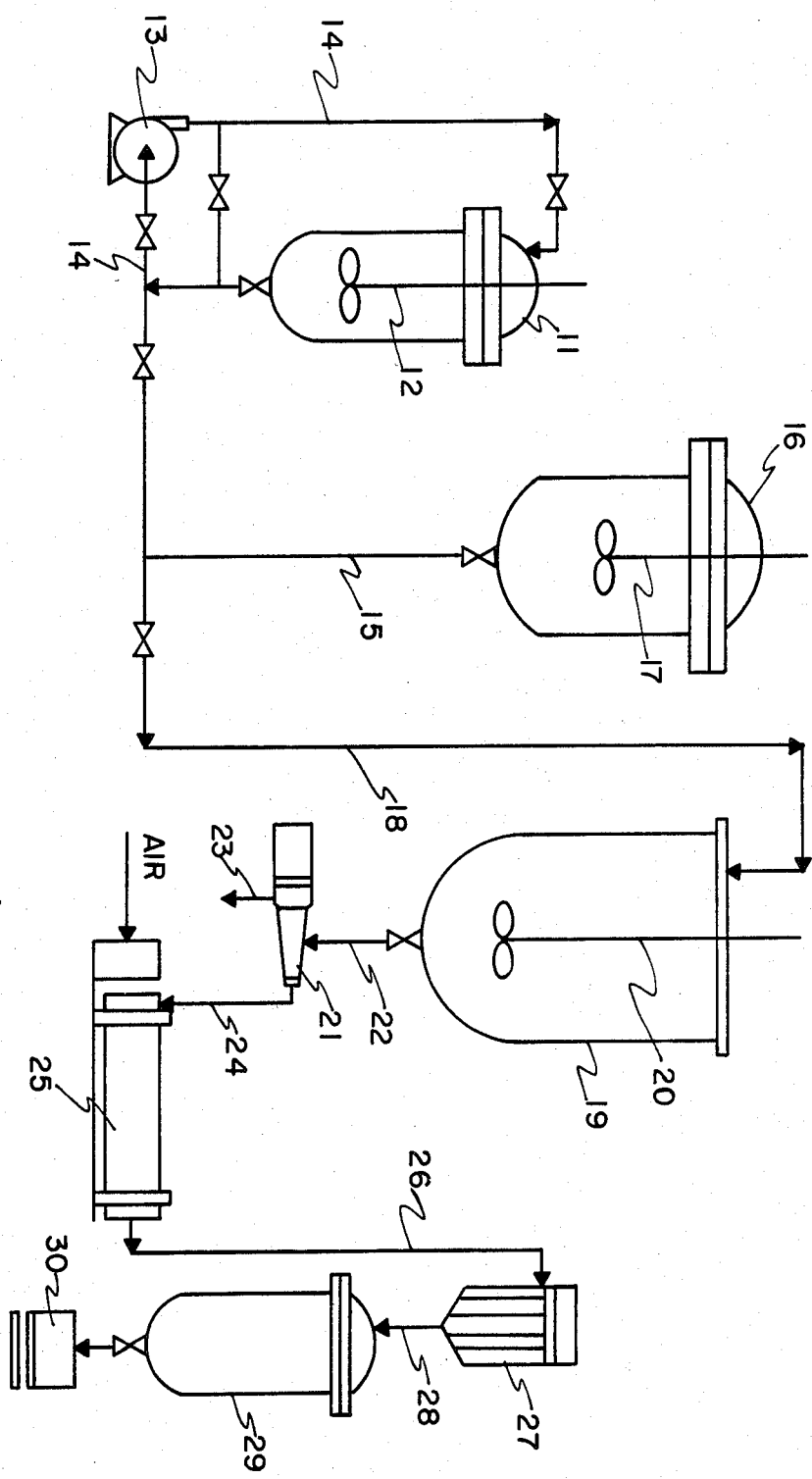

HOMOGENIZER PROCESS FOR FORMING EMULSION/SUSPENSION POLYMERS

This is a continuation of application Ser. No. 920,599 filed June 29, 1978 abandoned.

BACKGROUND OF THE INVENTION

1. Field of the Invention

The present invention relates to an improvement in multistep emulsion/suspension polymerization techniques for forming polymeric materials.

2. Description of the Prior Art

A variety of multistep polymerization procedures involving one or more initial emulsion and one or more later suspension polymerization steps are known. The use of the terminology "emulsion/suspension polymerization" in describing the present invention is intended to relate to this general type of polymerization procedure. Thus, in U.S. Pat. No. 3,657,172 to Ruth E. Gallagher et al., rubber-containing interpolymers are formed by suspension polymerizing from about 40% to about 99%, by weight of the interpolymer, of vinyl monomer in the presence of a previously formed aqueous emulsion of particles comprising from about 0.5% to about 50%, by weight of the interpolymer, of a hard inner core of a polymer having a glass transition temperature (Tg) above about 25° C. and from about 0.5% to about 59%, by weight of the interpolymer, of an outer layer comprising a crosslinked rubber having a Tg of less than about 25° C. U.S. Pat. No. 3,832,318 to Ruth E. Gallagher et al. describes the formation of rubber-containing interpolymers which are prepared by suspension polymerizing from about 40% to about 98%, by weight of the interpolymer, of a vinyl monomer in the presence of from about 2% to about 60%, by weight of the interpolymer, of particles of a cross-linked acrylate rubber having a Tg of less than about 25° C. A more recent example of such multistep emulsion/suspension polymerization procedures is described in U.S. Pat. No. 3,944,631 to A. J. Yu et al. which, in one embodiment, describes the suspension polymerization of from about 15% to about 90%, by weight of the interpolymer, of styrene and acrylonitrile in the presence of an aqueous latex of interpolymer particles comprising from about 5 to about 50%, by weight of the interpolymer, of a cross-linked (meth)acrylate component and from about 5% to about 35%, by weight of the interpolymer, of a cross-linked styrene-acrylonitrile component.

In the above types of processes, an emulsifying agent is used in the initial emulsion polymerization step or steps to form a latex of polymer particles. This emulsion polymerization portion of the process is performed using conventional emulsion polymerization techniques. The latex, or the emulsion resin particles isolated therefrom, is then used as one of the ingredients during one or more later, conventional suspension polymerization procedures. The presence of residual emulsifying agent in either the latex, or the product isolated therefrom, however, has a tendency to interfere with the dispersing ability of the suspending agent used in the suspension polymerization step or steps. This often leads to a certain degree of polymer flocculation during the suspension polymerization step or steps which can be especially deleterious in plant scale polymerizations where the reaction mixture needs to be pumped through piping during commercial operations. The presence of polymer flocculation tends to interfere with such pumping operations.

SUMMARY OF THE PRESENT INVENTION

The present invention is an improved, multistep emulsion/suspension polymerization process, wherein homogenization is used to disperse the monomeric reactants during one or more of the emulsion polymerization steps to thereby reduce the amount of emulsifier needed during that portion of the overall process. This also serves to thereby reduce the likelihood of emulsifier-suspending agent interference during the later suspension polymerization portion or portions of the process. The later suspension polymerization phase uses the emulsion polymerized product, or the latex containing it, as a reaction ingredient. The present process aids in reducing the amount of polymer flocculation and consequent reactor fouling during the emulsion polymerization portion of the process and aids in increasing the bulk density of the resin during the latter suspension polymerization portion of the process.

DESCRIPTION OF THE DRAWING

The Drawing, which forms a portion of this specification, should be consulted to obtain a full understanding of the present invention, wherein the FIGURE shows a flow diagram for a typical commercial scale process of one embodiment of the present invention wherein two reactors are employed.

DESCRIPTION OF PREFERRED EMBODIMENTS OF THE PRESENT INVENTION

The terminology "emulsion/suspension polymerization process" is to be understood as referring to those aqueous, multistep processes wherein one or more emulsion polymerizations are employed to form a polymer latex (and the polymer product contained therein) which is used as an ingredient in one or more later suspension polymerization procedures.

One class of such "emulsion/suspension polymerization" processes involves the initial polymerization of rubbery monomers, such as, acrylic, methacrylic or olefinic monomers, optionally in the presence of an effective amount of a polyethylenically unsaturated crosslinker monomer, to form a latex of rubber polymer particles. This latex, or the rubbery particles, are then used as one ingredient in the later suspension polymerization of a monomer which would form a relatively more rigid polymer composition, e.g., a vinyl halide or styrene-acrylonitrile resin. Further details regarding certain preferred embodiments of such prior art emulsion/suspension processes are described in the aforementioned U.S. Pat. Nos. 3,657,172; 3,832,318; and 3,944,631, each of which is incorporated herein by reference for its teaching of representative ingredients, and amounts thereof, which may be used in practicing such prior art procedures, as well as a description of the necessary process parameters for such processes. Also included within the scope of the present invention is an emulsion/suspension polymerization process for forming acrylonitrile-butadiene-styrene (ABS) polymers. These polymers comprise either: (a) from about 60 to about 90% of a styrene-acrylonitrile copolymer (in a 60–80:40–20 weight ratio) graft polymerized onto from about 10 to about 40% of an acrylonitrile-butadiene copolymer (in a 60–80:40–20 weight ratio; or (b) a similar amount of a similar styrene-acrylonitrile copolymer graft polymerized onto a similar amount of a polybutadiene homopolymer. The butadiene containing polymer or copolymer is formed by emulsion polymerization, whereas the styrene-acrylonitrile copolymer is formed by suspension polymerization.

The gist of the present invention comprises the use of homogenization during the emulsion polymerization portion or portions of the aforementioned types of procedures to mechanically emulsify the desired monomers and thereby produce a reduction in the amount of emulsifier that needs to be utilized in that portion of the overall process. By using this technique, the amount of emulsifier that is used can be reduced from the more typical conventional range of from about 1% to about 5%, by weight of the monomers, preferably from about 1% to about 2%, to a much lower level of from about 0.3% to about 0.75%.

In the case of procedures involving more than one emulsion polymerization step, the homogenization procedure is preferably performed in each separate polymerization step to achieve the greatest degree of improvement, although benefits of a more reduced level are nevertheless realized if the homogenization procedure is performed in less than all of the emulsion steps when more than one such emulsion polymerization step is present. The emulsion and suspension polymerization portions of the present invention can be carried out in either the same reactors or in different reactors.

Any suitable apparatus can be used to mechanically disperse the monomers in the water which forms the major component of the polymerization reaction medium. The monomer-water mixture (optionally in the presence of the aforementioned small amounts of emulsifier) is then agitated for a sufficient period of time to form a stable homogenized solution, for example, from about 5 to about 90 minutes. The preferred time for homogenization exceeds about 30 to 40 minutes. The time needed to achieve such homogenization will depend upon such variables as the capacity of the apparatus, the type of monomer or monomers to be polymerized, the amount of monomer in the water solvent, the type and amount of any optional emulsifier or emulsifiers, and the like. When this stable, homogenized solution is formed, it can be combined with the other components of the reaction medium (for example, an emulsion polymerization initiator, buffers, and other conventional emulsion polymerization reactants) and can be heated to the appropriate polymerization temperature for the appropriate length of time to achieve the desired degree of polymerization. The latex (or product therefrom) resulting from the improved emulsion polymerization process of the present invention is then used as an ingredient in one or more later aqueous suspension polymerization procedures, wherein a suspending agent is contained in the reaction medium along with one or more suspension polymerization initiators and other conventional reactants.

The Drawing illustrates a typical flow diagram for a commercial scale operation for the embodiment of the present invention which is described later in this specification in Example 1.

The first portion of the reaction can be conducted in reactor 11 which is equipped with suitable agitation means 12. A suitable homogenizer 13 (Tekmar Dispax Reactor Type DR-3-13-4) having a suitable homogenization rate (e.g., 378.5 liters of solution per minute) can be placed in feed line 14 so as to be capable of homogenizing the reactor batch which can then be recirculated back to reactor 11 for the emulsion polymerization of the reagents contained therein.

After the first portion of the reaction is concluded, the product latex can be transferred through lines 14 and 15 to reactor 16 (which is preferably also equipped with agitator means 17) for the suspension polymerization portion of the reaction.

Upon termination of the suspension polymerization step, the aqueous medium containing the final emulsion/suspension polymer product can be transferred via lines 15 and 18 to a suitable blend tank 19 also equipped with an agitator 20 for keeping the polymer particles suspended in the aqueous solvent medium in the form of a slurry. A wet cake of the desired product can then be separated from the water phase by means of centrifuge 21 after transfer thereto through line 22. The separated water is removed through line 23 from the centrifuge.

The desired product wet cake from the centrifuge 21 is then transferred via line 24 to a rotary drier 25, and the dried product from the drier is then transferred through line 26 to a bag house 27 to separate the resin from the air stream. The resin drops through line 28 to check bin 29 and then to appropriate storage means (not shown) which can be an appropriate storage silo. From the storage means, the product can then be transferred to appropriate container means 30 for shipment to the desired customer.

The following Examples illustrate certain preferred embodiments of the present invention.

EXAMPLE 1

This Example illustrates the process of the present invention in making the acrylate-styrene-acrylonitrile composition described in U.S. Pat. No. 3,944,631 to A. J. Yu et al.

The first portion of the reaction was conducted in a 15,140 liter reactor equipped with an agitator and consisted of the first two polymerization steps shown in U.S. Pat. No. 3,944,631 wherein an interpolymer comprising crosslinked polybutyl acrylate and crosslinked styrene-acrylonitrile polymeric components was formed. The following ingredients were used in this aspect of the process:

| Ingredients | Amount |
| --- | --- |
| Butyl acrylate monomer | 1480 kg. |
| Butylene glycol diacrylate crosslinker | 3.9 kg. |
| Deionized water | 2764 kg. |
| Stearyl alcohol lubricant | 17.7 kg. |
| Sodium bisulfite initiator | 454 gm. |
| Sodium lauryl sulfate emulsifier solution (30 wt. % active) (SIPEX-UB from Alcolac, Inc.) | 6.8 kg. |
| Sodium isodecyl sulfosuccinate emulsifier solution (50 wt. % active) (AEROSOL A-268 from American Cyanamid) | 17.7 kg. |
| Ammonium persulfate initiator solution/Deionized water mixture | 1.36 kg./9 kg. |
| Sodium bisulfite initiator/ Deionized water mixture | 227 gm./2.27 kg. |
| Divinyl benzene crosslinker | 5.6 kg. |
| Styrene monomer | 392.7 kg. |
| Acrylonitrile monomer | 143 kg. |
| Deionized water | 4695 kg. |

The following procedure was used:

(1) Butyl acrylate (153.5 kg.) and butylene glycol diacrylate (3.9 kg.) were charged into a container and were thoroughly mixed;

(2) The stearyl alcohol lubricant was charged into the reactor along with the remaining butyl acrylate and the mixture from Step 1. The mixture from this step was then circulated through the homogenizer for 10 minutes to mix it more completely;

(3) The sodium lauryl sulfate and disodium isodecyl sulfosuccinate were premixed in 18.9 kg. of deionized water and were charged into the reactor through a defoamer pot;

(4) The sodium bisulfite was dissolved in 18.9 kg. of deionized water and was also charged into the reactor through a defoamer pot;

(5) The reactor agitator was turned to a slow speed setting and 2650 kg. of deionized water was added to the reactor;

(6) The mixture in the reactor was circulated through the homogenizer until the solution was fully homogenized. The homogenization lines were then flushed with 75.7 kg. of deionized water;

(7) During homogenizer step (6), the reactor was evacuated to a pressure of 25.4 cm. Hg. and was purged three times with nitrogen gas to a final pressure of 3.52 kg./cm.$^2$ (gauge);

(8) After steps (6) and (7) were completed, deionized water (4695 kg.) was charged into the reactor, and the batch was brought to 54.5° C.;

(9) When the batch reached 54.5° C., the ammonium persulfate initiator (1.36 kg.) and water (9 kg.) solution was pumped in at a rate of 1.5 kg./min. to initiate the polymerization. When the temperature began to fall, 454 gm. of ammonium persulfate in 4.5 kg. of deionized water was added. The polymerization reaction was allowed to proceed at 54° C.;

(10) Styrene (130 kg.), acrylonitrile (47.7 kg.) and divinyl benzene (1.87 kg.) were then mixed into each of three clean drums and the mixtures were stirred well;

(11) After about one hour had elapsed for the reaction in step (9), the total solids percentage was checked for a latex sample from the reactor, and the three drums of material from step (10) were added to the reactor without agitation. The reactor was purged with nitrogen as described for step (7), and the batch was heated to 54.4° C.,

(12) The reaction described in step (11) was continued at 54.4° C. until the temperature began to decrease, and a mixture of ammonium persulfate (454 gm.) and deionized water 4.5 kg. was added; and

(13) One half hour after the difference between the batch and jacket temperature became zero (indicating no more generation of heat due to imminent completion of the reaction), the agitator was turned off, and the reaction mixture was allowed to stand for 1.5 hours.

The second portion of the reaction was conducted in a 22,710 liter reactor equipped with an agitator. It involved the last polymerization step shown in U.S. Pat. No. 3,944,631 wherein the uncrosslinked styrene-acrylonitrile component was formed in the presence of the previously formed interpolymer. The following ingredients were used in this aspect of the process:

| Ingredient | Amount (in kg.) |
| --- | --- |
| Styrene monomer | 2152 |
| Acrylonitrile monomer | 939.8 |
| Normal dodecyl mercaptan chain transfer agent | 9.8 |
| Stearyl alcohol lubricant | 17.7 |
| Sodium lauryl sulfate (SIPEX UB) | 2.8 |
| Polyvinyl pyrrolidone suspending agent | 5.6 |
| Methyl cellulose suspending agent | 11.1 |
| Deionized water | 4657 |
| Azobisisobutyronitrile initiator | 2.7 |
| Sodium bicarbonate buffer | 13.6 |
| Butylated hydroxytoluene | 2.3 |

The following procedure was used:

(1) The stearyl alcohol, normal dodecyl mercaptan, styrene, and acrylonitrile were added to the reactor and were mixed for 10 minutes;

(2) With the agitator in the reactor at a speed of 80 r.p.m., the polyvinyl pyrrolidone solution, sodium lauryl sulfate, and sodium bicarbonate were added to the mixture resulting from step (1), and agitation was continued for 10 minutes. The agitator was then turned off, and the latex from the previous step of the process was added. The agitator was then turned on and set at 80 r.p.m. for 30 minutes. Deionized water (3290.34 kg.) was then added;

(3) The suspending agent was predispersed in a mixing tank in about 378.6 kg. of water, which was at 71.1° C. or higher, and this mixture was agitated at this temperature for about 1 hour. Cold water (about 757 kg.) was then added to the mixing tank, and the solution was allowed to cool. Agitation was continued until the solution turned clear, and it was then added to the reactor. Two hundred twenty-seven and two-tenths (227.2) kilograms of water was used to flush the mixing tank and lines leading to the reactor. Agitation was continued in the reactor for an additional two hours;

(4) The azobisisobutyronitrile initiator was then added to the reactor;

(5) With the agitation rate set at 80 r.p.m., the reactor was purged with nitrogen three times as described in connection with the first aspect of the reaction;

(6) The temperature of the reaction medium was then set at 71.1° C.;

(7) When the temperature differential between the batch and the reactor jacket began to fall, thereby signalling the near completion of the reaction, an additional 454 gm. of initiator was added in order to aid in conversion of the remaining residual monomers;

(8) The reaction was allowed to continue until the difference in temperature between the reaction mixture and the jacket of the reactor became zero. Two hours after this occurred, butylated hydroxytoluene (2.27 kg.) was added to terminate the reaction, and the reactor was cooled and vented to suitable recovery equipment.

The product from the reactor was centrifuged to form a wet cake having a moisture content of about 25%, by weight, and the wet cake was dried in a rotary drier to a moisture content of about 1%, by weight. The material had an Izod impact of about 5.34 Joule/cm. and a heat distortion temperature of about 88° C. The reactor wall fouling was lighter than would result from a conventional non-homogenizer emulsion/suspension procedure, and the polymer deposits which occurred were easily removed by washing with an organic solvent.

EXAMPLE 2

This Example illustrates the physical properties of a series of acrylate-styrene-acrylonitrile compositions made by the general procedure described in Example 1.

Screen analysis of the products from each batch run yielded the following data:

| Sample | Screen Analysis (% Retained) MESH SIZE | | | | | | |
|---|---|---|---|---|---|---|---|
| No. | 40 | 60 | 80 | 100 | 140 | 200 | Pan |
| 1 | 56.0 | 31.5 | 4.7 | 2.0 | 2.6 | 2.1 | 2.6 |
| 2 | 40.8 | 37.5 | 8.1 | 3.1 | 6.0 | 3.5 | 4.2 |
| 3 | 36.4 | 41.0 | 8.8 | 3.0 | 4.4 | 3.1 | 4.5 |
| 4 | 12.0 | 44.5 | 12.5 | 6.1 | 10.1 | 7.8 | 8.3 |
| 5 | 54.3 | 32.4 | 4.1 | 1.9 | 2.0 | 1.8 | 3.1 |
| 6 | 67.9 | 24.7 | 2.6 | 0.7 | 1.3 | 1.1 | 2.3 |
| 7 | 22.9 | 40.3 | 14.3 | 5.2 | 7.5 | 4.9 | 5.7 |

Other pertinent physical properties for the above samples were as follows:

| Sample No. | Bulk Density (gm./cc) | Izod Impact (Joule/cm.) Vent | Izod Impact (Joule/cm.) Gate | Tensile Str. (Newtons/cm$^2$) | HDT (°C.) | Elong % |
|---|---|---|---|---|---|---|
| 1 | 0.481 | 5.13 | 6.09 | 3740 | 85.6 | 78 |
| 2 | 0.472 | 5.02 | 5.77 | 3701 | 85.6 | 78 |
| 3 | 0.468 | 4.75 | 5.55 | 3789 | 87.8 | 72 |
| 4 | 0.444 | 4.81 | 5.71 | 4060 | 90 | 72 |
| 5 | 0.446 | 4.64 | 5.45 | 3883 | 86.7 | 74 |
| 6 | 0.424 | 4.32 | 4.59 | 3883 | 87.8 | 62 |
| 7 | 0.384 | 5.13 | 5.39 | 4424 | 90.0 | 54 |

These data illustrate that the polymers that resulted had rather consistent physical properties from batch to batch, especially the high Izod impact and high heat distortion temperature (HDT) values.

The Izod impact, tensile strength, heat distortion temperature and elongation values were determined on injection molded samples of the resin particles. The terms "valve" and "gate" indicate the impact resistance for those ends of the injection molded test piece adjacent either the vent opening and the gate entrance of the molding apparatus, respectively.

EXAMPLE 3

This Example illustrates the variation in flocculation as a function of the time of homogenization. Generally, an increase in the time of homogenization will yield a lower amount of flocculation. The general procedure of Example 1 was employed using, as the emulsifiers, 0.138 parts by weight of sodium lauryl sulfate emulsifier solution (SIPEX-UB) and 0.598 parts by weight of disodium isodecyl sulfosuccinate emulsifier solution (AEROSOL A-268), per 100 parts by weight of monomer.

| Batch No. | Homogenization Time (min.) | Average Particle Size (microns) | Weight of Flocculant -Wet (kg.) |
|---|---|---|---|
| 1 | 20 | 0.28 | 36.32 |
| 2 | 30 | 0.22 | nil |
| 3 | 35 | 0.25 | 22.70 |
| 4 | 45 | 0.25 | nil |

EXAMPLE 4

This Example illustrates the process of the present invention when used to make a rubber-containing interpolymer by suspension polymerizing a vinyl monomer in the presence of an aqueous emulsion of particles of a cross-linked acrylate rubber as described in U.S. Pat. No. 3,832,318 to Ruth E. Gallagher et al. The reaction was carried out in a 38 liter pilot plant reactor.

The ingredients which were used in the first portion of the reaction were:

| Ingredients | Amount |
|---|---|
| Butyl acrylate monomer | 2.84 kg. |
| 2-ethylhexyl acrylate monomer | 1.1 kg. |
| Butylene glycol diacrylate crosslinker | 82 gm. |
| Stearyl alcohol lubricant | 45 gm. |
| Sodium lauryl sulfate emulsifier solution (SIPEX UB) | 20 gm. |
| Disodium isodecyl sulfosuccinate emulsifier solution (AEROSOL A-268) | 20 gm. |
| Sodium bisulfite initiator | 2 gm. |
| Deionized water | 17.5 liters |
| Ammonium persulfate initiator (in 100 ml. H$_2$O) | 6 gm. |

The first four ingredients were homogenized for 30 minutes in the homogenizer used in Example 1, the reactor was charged with this homogenized solution, and the next four ingredients were added. The reactor was brought to 48.0° C., with an agitator rate of 200 rpm, after it had been evacuated and purged three times with nitrogen gas.

The ammonium persulfate initiator solution was then added to the reaction mixture, and, after 1 hour, the reaction temperature was raised to 71.1° C. for an additional hour.

After the reactor was cooled and was vented to suitable recovery apparatus, the latex was recovered. The majority of the polymer particles in the latex had a particle size of from about 2 to 2.5 microns.

The second portion of the reaction was then conducted in the same reactor using the latex from the first portion of the reaction with the following reactants:

| Ingredients | Amount |
|---|---|
| Vinyl chloride monomer | 5.5 kg. |
| Polyvinyl pyrrolidone suspending agent (in 200 ml. water) | 2 gm. |
| Azobisisobutyronitrile initiator (VAZO 64 from Du Pont) | 10 gm. |
| Methyl cellulose suspending agent | 2.3 kg. |
| Deionized water | 3.8 liters |

The latex from the first portion of the reaction, the azobisisobutyronitrile initiator, and the deionized water were charged into the reactor, and the agitator was set at 460 rpm. The polyvinyl pyrrolidone and methyl cellulose suspending agent were both charged into the reactor, and the mixture was agitated for 30 minutes. The reactor was evacuated three successive times and was purged each time with a small amount of vinyl chloride monomer. After this was accomplished, the vinyl chloride monomer was added, and the reaction was initiated at 60° C. When the pressure in the reactor had dropped 4.2 kg./cm.$^2$ from its initial value, the reactor was allowed to cool to ambient temperature, was vented to suitable recovery equipment, and the product was recovered. The inside of the reactor showed only a light polymer skin buildup except at the very bottom of the reactor's interior.

EXAMPLE 5

This Example illustrates the process of the present invention when used to make an acrylonitrile-butadiene-styrene (ABS) polymer. The reaction was conducted in the same reactors used in Example 4.

The following ingredients were used in the first portion of the reaction:

| Ingredients | Amount |
|---|---|
| Butadiene monomer | 2.7 kg. |
| Acrylonitrile monomer | 596 gm. |
| Sodium bisulfite initiator | 5 gm. |
| Sodium lauryl sulfate emulsifier solution | 15 gm. |
| Disodium isodecyl sulfosuccinate emulsifier solution (AEROSOL A-268) | 35 gm. |
| Potassium persulfate initiator | 40 gm. |
| Deionized water | 14.9 kg. |

Deionized water (3.79 kg.), the two emulsifiers and the sodium bisulfite were charged into the reactor along with the acrylonitrile. The reactor was evacuated and purged five times with a small amount of butadiene to remove oxygen. The butadiene reagent was added, and the entire batch was then homogenized for 10 minutes and was flushed into the reactor with the addition of 7.6 kg. of deionized water. The potassium persulfate initiator and 3.79 kg. of additional deionized water were pumped into the reactor while the reaction mixture was heated to 73.9° C. When the reactor pressure fell to 1.41 kg./cm.$^2$ (gauge), the reactor was allowed to cool, and the product latex was recovered. The reactor showed only a light to medium polymer skin on its interior surfaces above the liquid reaction level and was clean below that level. Most of the polymer particles in the latex had a particle size of from about 1.0 to about 1.8 mm.

The second portion of the reaction was conducted using the latex from the first portion of the reaction with the following additional ingredients:

| Ingredients | Amount |
|---|---|
| Styrene monomer | 4.23 kg. |
| Acrylonitrile monomer | 1.87 kg. |
| Normal dodecyl mercaptan chain transfer agent | 20 gm. |
| Stearyl alcohol lubricant | 36 gm. |
| Polyvinyl pyrrolidone suspending agent (in 200 ml. water) | 5 gm. |
| Methyl cellulose suspending agent solution | 4.54 kg. |
| Azobisisobutyronitrile initiator (VAZO 64) | 10 gm. |
| Sodium bicarbonate | 20 gm. |
| Octadecyl 3-(3',5'-di-tert-butyl-4'-hydroxyphenyl) propionate stabilizer (IRGANOX 1076, from Ciba-Geigy) | 8 gm. |
| Mineral spirits | 100 gm. |
| Deionized water | 7.6 liters |

The reactor agitator was set at 200 rpm and the following ingredients were added in the following order: (1) the latex from the first portion of the reaction; (2) the polyvinyl pyrrolidone suspending agent solution; (3) the methyl cellulose suspending agent solution; (4) the azobisisobutyronitrile initiator; sodium bicarbonate buffer, and deionized water; and (5) the styrene, acrylonitrile, stearyl alcohol, and normal dodecyl mercaptan which had been premixed. The reactor was evacuated and purged three times with nitrogen, and pressure in the reactor was built up to 0.703 kg./cm.$^2$ (gauge) with addition of nitrogen gas. The agitator was set at 460 rpm, and the reaction was initiated at 71.1° C. The reaction was conducted for 2 hours after the temperature stabilized, and the stabilizer (IRGANOX 1076) and mineral spirits were then added. The solution was agitated for 10 minutes, and the reactor was allowed to cool, was vented, and the product was recovered. Only a light to medium polymer skin buildup was noted on the interior walls of the reactor.

The foregoing Examples illustrate certain preferred embodiments of the invention and should not be construed in a limiting sense. The scope of protection which is sought is given in the claims which follow.

What is claimed is:

1. In an aqueous, emulsion/suspension polymerization process for forming polymeric materials comprising at least one initial emulsion polymerization reaction of monomer in water to form a rubbery polymer and at least one subsequent suspension polymerization process in which the rubbery emulsion polymerization product is used as a reaction ingredient in a reaction mixture which also comprises at least one monomer adapted to form a rigid polymer, wherein the improvement comprises the mechanical homogenization of the monomer adapted to form said rubbery polymer in water prior to said emulsion polymerization process.

2. A process as claimed in claim 1 wherein the homogenization is conducted for a period of time ranging from about 5 to about 90 minutes.

3. A process as claimed in claim 1 or 2 wherein the monomer that is polymerized in the emulsion polymerization reaction is selected from the group consisting of acrylic, methacrylic, and olefinic monomers.

4. A process as claimed in either of claims 1, 2 or 3 wherein an effective amount of crosslinker monomer is also present during the emulsion polymerization.

5. A process as claimed in either claim 1, 2, 3 or 4 wherein the monomer used in the suspension polymerization process is selected from the group consisting of the vinyl halides, styrene, and acrylonitrile.

* * * * *